March 19, 1963  R. S. EMERSON  3,081,642
VARIABLE SPEED DRIVE

Filed July 27, 1961  4 Sheets-Sheet 1

INVENTOR
REGINALD S. EMERSON

March 19, 1963 R. S. EMERSON 3,081,642
VARIABLE SPEED DRIVE
Filed July 27, 1961 4 Sheets-Sheet 3

INVENTOR
REGINALD S. EMERSON

March 19, 1963 R. S. EMERSON 3,081,642
VARIABLE SPEED DRIVE

Filed July 27, 1961 4 Sheets-Sheet 4

Inventor
REGINALD S. EMERSON

By *Munce and Smiley*
Attorneys

3,081,642
VARIABLE SPEED DRIVE

Reginald S. Emerson, Buckingham, England, assignor to Leslie Hartridge Limited, Buckingham, England, a British company
Filed July 27, 1961, Ser. No. 127,259
3 Claims. (Cl. 74—230.17)

This invention has reference to variable speed drives of the type comprising an input V pulley of expanding type, an output V pulley of expanding type, shafts bearing the respective pulleys and a V-belt connecting the pulleys, each of said pulleys comprising two flanges or halves, one of which is movable laterally with respect to its companion flange. When one movable flange of either pulley is thrust towards its fixed companion flange the diameter of the arc of contact of the belt with the pulley increases and, conversely, the diameter of the arc of contact of the belt with the pulley contracts when the movable flange is displaced away from its companion flange. Thus the speed of the output shaft can be changed with respect to the input shaft by displacing one movable pulley flange towards its companion while simultaneously displacing the other movable pulley flange away from its companion.

When the movable flange of a pulley is moved towards the companion flange the pulley is physically contracted, in that it is made narrower, but the effective diameter on which the belt runs is increased and in the following description the phrase "expanding the pulley" will be used to denote the movement of the movable flange towards the companion fixed flange to cause the belt to run on a larger effective diameter, and the phrase "contracting the pulley" will be used to denote the movement of the movable flange away from the fixed companion flange to allow the belt to run on a smaller effective diameter.

One object of the invention is to provide a variable speed drive of the above described type in which hydraulic actuating devices are embodied in the expanding pulleys on the driving and output shafts.

Another object of the invention is to provide a variable speed drive of the above described type in which the use of complex and expensive thrust arrangements acting on the movable pulley flanges is avoided by use of hydraulic actuating means.

A further object is to provide a variable speed drive of the above described type in which a substantially constant hydraulic pressure is maintained on one movable pulley flange and a differential hydraulic pressure is applied to the other pulley in order to expand the said other pulley or allow it to contract.

Still another object is to provide a variable speed gear of the above described type in which the hydraulic expansion and contraction of the pulleys is controlled by electrically actuated valves, whereby remote control of the variable speed drive becomes readily possible.

Other and further objects and advantages of the invention will become apparent from a study of the following description of one example of the invention and a modification thereof, having reference to the accompanying drawings.

In the drawings—

Figure 1:
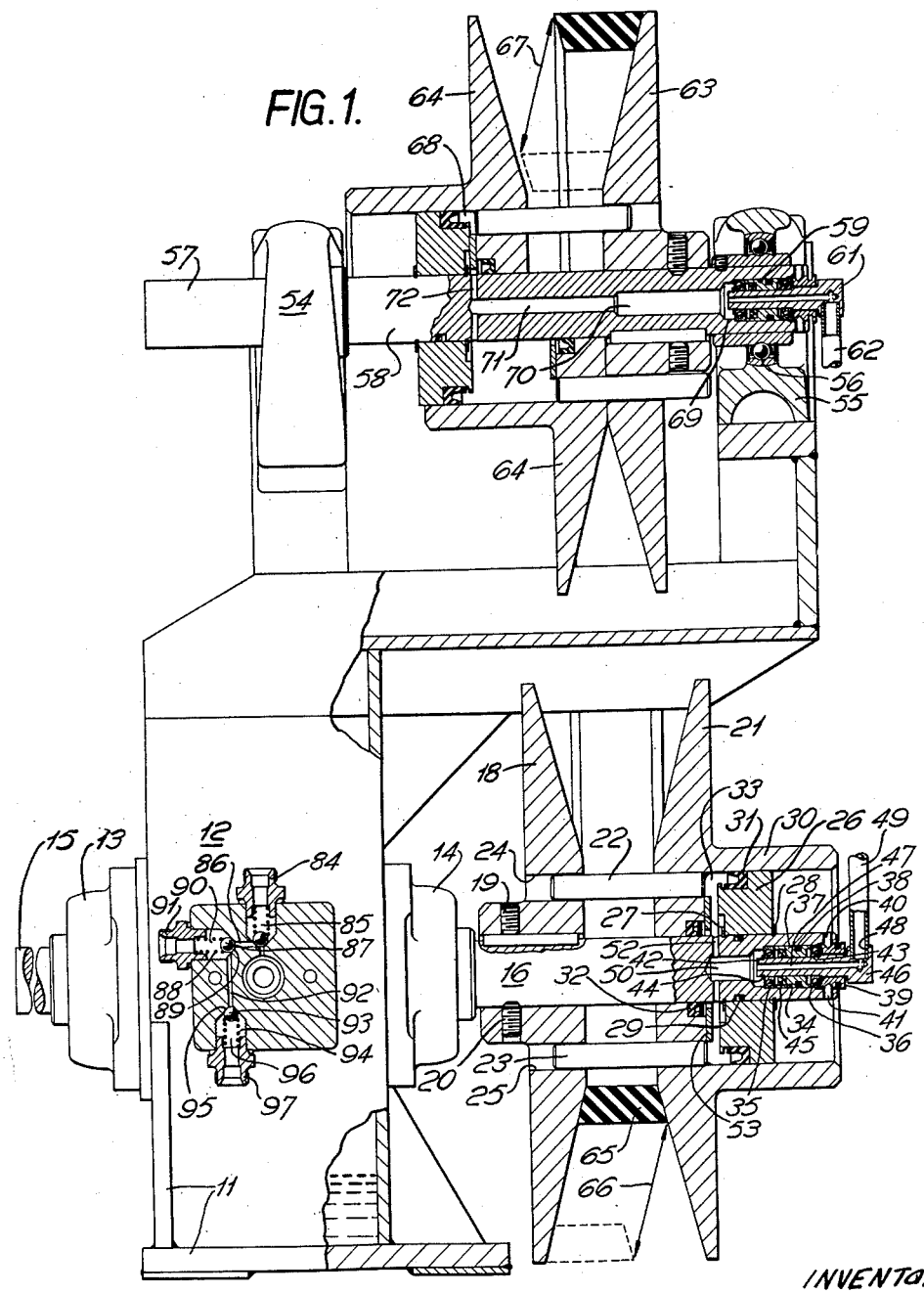
FIGURE 1 is an elevation partly in section of one form of variable speed drive according to the invention.
Figure 2:
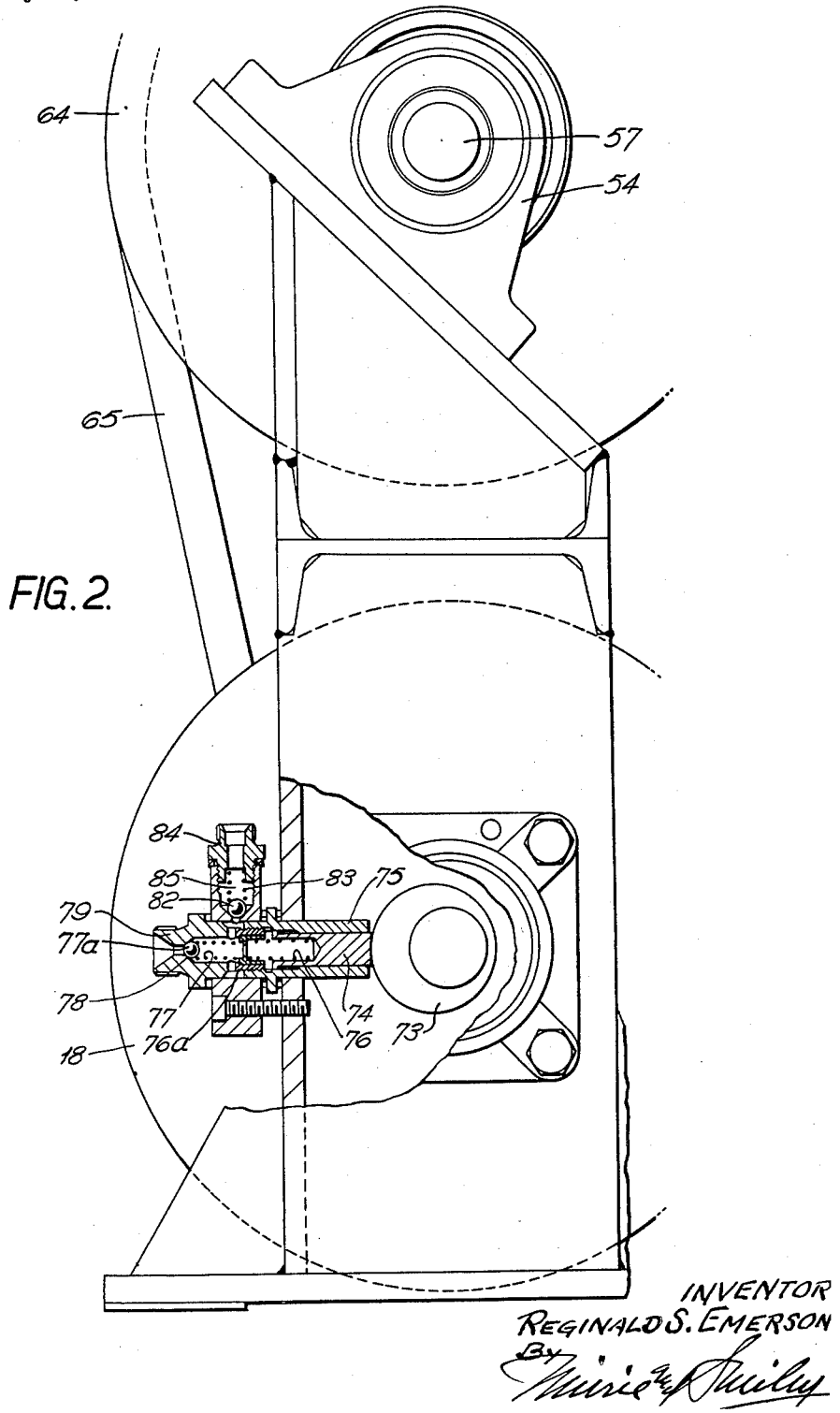
FIGURE 2 is a side elevation of the variable speed drive of FIGURE 1.

Referring initially to FIGURES 1 and 2, the variable speed drive comprises a welded framework or supporting structure 11, which will not be described in detail since it is not a part of the invention and may be made in different forms according to particular requirements. It may also be replaced by a cast structure if so desired. Mounted on the supporting structure is a casing 12 containing two bearings respectively 13 and 14 which carry an input shaft projecting at both ends. One end, 15, projects from the bearing 13 and is adapted to be coupled to a source of driving power (not shown). The other end, 16, of the input shaft is provided with a slot to accommodate a key 17 near the bearing 14 which engages a keyway in the boss of a pulley half or flange 18. The flange 18 is kept in locked relationship with the shaft portion 16 by a grub screw 19 which bears on the key 17 and a second grub screw 20 which engages a suitably formed recess in the shaft portion 16.

The shaft portion 16 supports a movable flange 21 which is bored to such a diameter as to be a sliding fit on the shaft 16. Two pins, respectively 22 and 23, are force fits in bores formed in the flange 21 and project in directions parallel to the axis, and at diametrically opposite points, from the flange 21 towards and into bores 24 and 25 formed in the flange 18, the pins 22 and 23 being sliding fits in the respective bores 24 and 25. The adjacent faces of the flanges 18 and 21 are formed to the correct angles to accept a V belt 65.

A ring-shaped piston member 26 is axially located on the shaft 16 by circlips 27 and 28 and a fluid pressure seal therebetween is provided by an O ring 29.

A tubular extension 30 formed integrally and co-axially with the flange 21 projects in a direction opposite to that of the pins 22 and 23. The outer diameter of the piston member 26 is a sliding fit in the bore of the tubular extension 30 and is maintained in fluid pressure sealing relation thereto by a sealing ring 31. The flange 21 is provided with a pressure sealing ring 32 to prevent leakage between the flange and the outer diameter of the shaft portion 16. A washer 53 is fixed to the inner face of the fixed flange 21 to keep the pressure seal 32 in position.

From the description so far given it will be evident that the flange 21 may be moved axially of the shaft portion 16 towards or away from the fixed flange 18, the flange 21 being compelled to rotate with the flange 18 due to the engagement of the pins 22 and 23 in the respective bores 24 and 25. By virtue of the seals 29, 31 and 32 a pressure-tight space 33 is formed within the tubular extension 30 bounded by the adjacent faces of the flange 21 and the piston member 26. The extension 30 in fact constitutes a hydraulic cylinder which is movable with respect to the piston member 26.

A co-axial bore 34 is formed in the shaft portion 16, in which the outer races of two ball bearings 35 and 36 are located, the ball bearings being separated by a sleeve 37. A pressure seal 38, in the form of an O ring, is disposed in a circumferential groove in the sleeve 37 and provides a pressure seal between it and the bore 34. A closure member 39 is located in an enlargement of the bore 34 and is held in position by a pair of grub screws 40 and 41 to secure the ball bearings 35 and 36 and the sleeve 37 against endwise movement.

A spindle 42 passes into the bore 34 from the outer end of the shaft portion 16 and is carried by the inner races of the ball bearings 35 and 36. It is located against axial movement by a shoulder 43 abutting the inner race of the ball bearing 36 and a circlip 44 which bears against the inner race of the ball bearing 35. The two diameters of the spindle 42 are respectively clearance fits in the closure member 39 and the sleeve 37 and a pressure seal 45 provides a seal between the sleeve 37 and the spindle 42. The spindle 42 is formed at its outer end with an enlargement 46 and a central bore 47 extending from the inner end of the spindle 42 to a point within the enlargement 46, communicates with a transverse bore which opens into a larger bore 48, in which a hydraulic conduit 49 is fixed.

It will be clear that when the shaft portion 16 is rotating the spindle 42 may remain stationary, being carried by the ball bearings 35 and 36, and the pressure seals 38 and 45 prevent hydraulic pressure applied through the conduit 49 from leaking outwardly of the shaft portion 16. The assembly thus constitutes a running pressure joint.

The inner end of the bore 34 in the shaft portion 16 communicates with a smaller bore 50 which in turn communicates with a cross bore 52, the cross bore being so positioned that it communicates with the space 33. By these means hydraulic pressure applied to the conduit 49 is conveyed to the space 33 and acts to move the movable flange 21 axially towards the fixed flange 18.

An output shaft parallel to the input shaft is disposed on another part of the framework between two pedestal bearings 54 and 55 each containing a ball bearing, the ball bearing in the pedestal 55 being shown in section and indicated by reference 56. The output shaft has a portion 57 projecting to one side of the pedestal 54 adapted to be coupled to a load (not shown) and another portion 58 which lies between the bearing pedestals. At its outer end the shaft portion 58 is provided with a bore 59 which corresponds with the bore 34 in the input shaft. Contained in the bore 59 is a spindle 60 having at its end an enlargement 61 to which a conduit 62 is connected in the same way as the conduit 49 is connected to the spindle 42. The spindle 60 is supported in the bore 59 by means of two ball bearings, with pressure seals to prevent leakage of pressure fluid, and does not need further description as it is similar to and serves the same purpose as the assembly in the bore 34 of the input shaft.

An expanding pulley mounted on the shaft portion 58 comprises a fixed flange 63 and a movable flange 64 corresponding respectively with the fixed flange 18 and the movable flange 21 on the input shaft. It will, however, be observed that whereas the fixed flange 18 is the left-hand flange, the fixed flange 63 is the right-hand flange of the pulley. The reason for this is that the belt 65, which is trained around the two pulleys, is enabled to move along the line defined by the double-headed arrows 66 and 67 as one pulley is expanded and the other pulley is contracted. In this way the belt is maintained substantially at right angles to both shafts at all pulley positions.

The fixed flange 63 is keyed and locked to the shaft portion 58 in exactly the same way as the fixed flange 18 is keyed and locked to the shaft portion 16, and the movable flange 64 is formed in the same way as the movable flange 21, having an extension in the form of a tubular portion which constitutes a hydraulic cylinder co-operating with a ring-like piston member located on the shaft portion 58. The movable flange 64 and the co-operating piston member are provided with pressure seals in the same way as the corresponding parts of the input shaft. In this way a space 68 is formed, corresponding to the space 33. The bore 59 communicates with a slightly smaller bore 69 which in turn communicates with a further bore 70 and still another bore 71, the latter communicating with a cross bore 72 corresponding with the cross bore 52, the bore 72 communicating with the space 68.

It should be observed that the view of the flange 64 is a composite view, the part above the shaft being shown in the fully contracted position of the pulley (that is, with the belt 65 running on the minimum diameter) while the portion below the shaft is shown in the fully expanded position (that is with the flange 64 moved to its maximum extent towards the flange 63).

Figure 3:
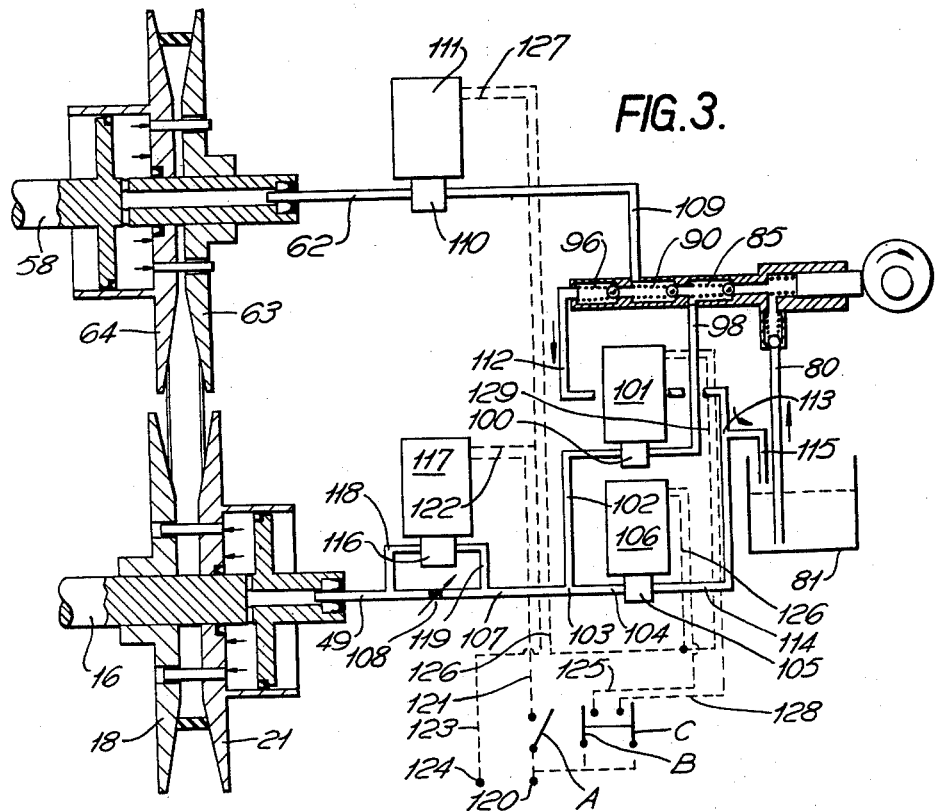
FIGURE 3 is a diagram showing a complete layout including electrical control means.

A hydraulic pump is mounted on the casing 12 and is driven by an eccentric 73 mounted on the portion of the driving shaft between the bearings 13 and 14. This comprises a reciprocating piston 74 acted upon by the eccentric 73 and working in a cylinder 75. A compression spring 76 acts at one of its ends upon the piston 74 to keep the piston in contact with the eccentric 73, the spring 76 thrusting at its other end against the internal flange of a bush 76a. A second spring 77 (less strong than spring 76) thrusting at one end against the brush 76a, thrusts at its other end against a ball 77a which co-operates with a seating 78 to form an inlet valve to admit liquid supplied by a pipe 80 (shown in FIGURE 3) connected to an inlet connection 79 which draws hydraulic liquid from a supply tank 81 which in FIGURE 3 is the casing 81.

The cylinder 75 communicates with a spring-loaded delivery valve in the form of a ball 82 loaded by a spring 83, the ball 82 and spring 83 working in a high pressure chamber 85 communicating with an outlet connection 84. As shown in FIGURE 1, the high pressure chamber 85 also communicates through a cross bore 86 with a pressure relief valve constituted by a ball 87 urged by a spring 88 on to a seating 89. The ball 87 and spring 88 operate in a medium pressure chamber 90 which is in communication with a further outlet connection 91. Another cross bore 92 leads from the chamber 90 to a further pressure relief valve constituted by a ball 93 urged by a spring 94 on to a seating 95, the ball 93 and the spring 94 operating in a low pressure chamber 96 which communicates with still another outlet connection 97.

As the input shaft rotates the eccentric 73 rotates therewith and reciprocates the piston 74. At each cycle of the piston 74 liquid is drawn in from the supply tank 81 past the ball 77a and discharged through the valve 82 into the high pressure chamber 85. Some of this liquid passes through the cross bore 86 and past the ball valve 89 to the medium pressure chamber 90 and some of this liquid passes therefrom through the cross bore 92 past the ball valve 93 to the low pressure chamber 96.

The operation of the invention will now be described with reference to FIGURE 3.

Liquid from the high pressure chamber 85 may pass through a pipe 98 connected to the outlet 84 to one side of the valve 100 of a solenoid valve which comprises an actuating solenoid 101. From the other side of the valve 100 the liquid may pass through a pipe 102 to a T junction 103. One side of the T junction leads through a pipe 104 to one side of the valve 105 of a solenoid valve comprising a solenoid 106, while the other side of the T junction leads through a pipe 107 to an adjustable restrictor 108 which communicates with the conduit 49 leading to the input shaft. The medium pressure chamber 90 is connected through the outlet connection 91 to a pipe 109 which leads to one side of the valve 110 of a solenoid valve comprising a solenoid 111 and thence to the conduit 62 connected to the output shaft. The low pressure chamber 96 is connected through a pipe 112 to one side of a T junction 113, the other side of which is connected to a pipe 114 leading from the other side of the valve 105. The central passage from the T junction 113 leads through a pipe 115 to the supply container 81.

The valve 116 of a further solenoid valve comprising a solenoid 117 is connected at one side to the duct 49 through a pipe 118 and at the other side to the pipe 107, though a pipe 119.

Electrical circuitry is provided for controlling the solenoids 101, 106, 111 and 117 and will now be described, the electrical wiring being indicated by dotted lines so that it may readily be distinguished from the solid lines representing the hydraulic circuitry. The live pole 120 of the electric supply mains is connected to one side of each of three switches marked A, B and C, the switch A being a make-and-break switch and the switches B and C being linked together in a three-position arrangement such that in a central position switches B and C are both open while a movement in one direction (to the right in FIGURE 3) closes the switch B, and a movement in the other direction (to the left in FIGURE 3) closes the switch C. The other side of the switch A is connected by a wire 121 to one end of the solenoid 117 and the other end of the said solenoid is connected through a wire 122 to a return wire 123 connected to the second pole 124 of the supply mains. Thus, closure of switch A opens the bypass around the adjustable restrictor 108. If the linkage of switches B and C is moved in such a way as to close the switch B current flows from the mains pole 120 through a wire 125 to one end of the solenoid 106, from the other end of this solenoid through a wire 126 to one end of the solenoid 111 and from the other end of this solenoid through a wire 127 to the return wire 123. Closing the switch B energizes the solenoids 106 and 111. If, now, the linkage of switches B and C is moved in the other direction to close the switch C then current from the mains flows through a wire 128 to one end of the solenoid 101, from the other end thereof through a wire 129 to a junction with wire 126 and thence through the solenoid and wire 127 to the return wire 123. Closure of the switch C energizes the two solenoids 101 and 111. It should be noted that solenoid 111 is energized when either switch B or switch C is closed.

In operation, assuming that the drive is running at a steady speed, all the solenoid valves are closed. The pump supplies liquid to the high pressure chamber 85, the pressure in the chamber being maintained by the two relief valves 89 and 93. There is a pressure drop across the valve 89 from the high pressure in chamber 85 to the medium pressure in chamber 90 and there is a further pressure drop across the valve 93 from the medium pressure to substantially atmospheric pressure, since the pipe 112 from the low pressure chamber 96 leads back to the supply receptacle and its open end is at atmospheric pressure. If it is desired to increase the output speed then the pulley on the input shaft must be expanded (that is, the pulley flanges must be brought closer together) and the pulley on the output shaft must be contracted (that is, the movable flange must be moved away from the fixed flange). For this purpose the switch linkage is operated to close the switch C, when current flows through the solenoid 101 and the solenoid 111. The solenoid 101 opens the valve 100 and permits liquid to flow from the high pressure chamber 85 through the pipes 98, 102 and 107 to the restrictor 108 and thence through the conduit 49 to the space 33 in the input shaft pulley, thus causing the movable flange 21 to be moved towards the fixed flange 18. At the same time the solenoid 111 opens the valve 110 so that communication is established between the medium pressure chamber 90 through the pipe 109 and the conduit 62 with the space 68 in the movable flange of the output shaft pulley. Since the hydraulic pressure applied to the flange 21 of the input shaft pulley is higher than that applied to the flange 64 of the output shaft pulley the former is expanded and as the belt progressively runs up on to larger diameters of the driving pulley it applies lateral pressure to the flange of the output shaft pulley to force this pulley to contract against the applied hydraulic pressure. It will be evident that while the speed is being changed the belt tension is maintained at a substantially constant level because of the substantially constant pressure applied to the hydraulic cylinder of the output shaft pulley. When the speed has been increased to a desired level the switch C is released and opens, de-energizing the two solenoids 101 and 111 whereby valves 100 and 110 close and the pressures in the hydraulic cylinders of the input and output pulleys are trapped and maintained at their former levels. In consequence the drive continues to run at the speed ratio to which it has been adjusted. The rate at which the speed is increased when the switch C is closed is determined by the rate at which liquid is allowed to pass through the restrictor 108. This is made manually adjustable in order that the rate of speed increase may be set to a desired value. If it should be desired to increase the speed very quickly (for example, in emergency) then switch A is closed at the same time as switch C, when the solenoid 117 opens the valve 116 to allow unrestricted flow of liquid through the pipes 119 and 118 to the conduit 49, so that the driving shaft pulley is expanded very rapidly.

When the output speed is to be reduced the switch linkage is operated in order to close switch B. This energizes the solenoid 106 to open the valve 105 and also energizes the solenoid 111 to open the valve 110. The conduit 62 is again connected to the medium pressure chamber 90 but the conduit 49 is now connected through the T junction 103 and pipes 104, 114 and 115 to the supply tank 81. Pressure in the driving pulley hydraulic cylinder accordingly falls and additional liquid is supplied from the medium pressure chamber 90 to cause the output shaft pulley to expand, the rate of flow of liquid to the output pulley being governed by the rate at which liquid flows out of the input pulley, i.e., the rate at which the input pulley is allowed to contract. This rate is again governed by the setting of the restrictor 108 and the extent to which the speed is changed depends upon the length of time for which switch B is held in the closed position. In this case also, operation of switch A to energize solenoid 117 and open valve 116 enable a rapid change of speed to be made. It will again be evident that the substantially constant pressure applied from the medium pressure chamber 90 will keep the belt tension substantially constant while the speed is being changed, and closure of the valves at the end of the speed change period will keep the hydraulic pressure in the pulleys at the set level.

During normal speed changing operations (that is, with the by-pass valve 116 closed) the hydraulic pressure in the input pulley is not much higher or lower than the pressure in the output pulley. During upward speed changes a large part of the difference in pressure between the chambers 85 and 90 is dissipated in the restrictor 108 and during downward speed changes pressure builds up across the restrictor 108 to maintain the pressure in the input pulley.

Figure 4:
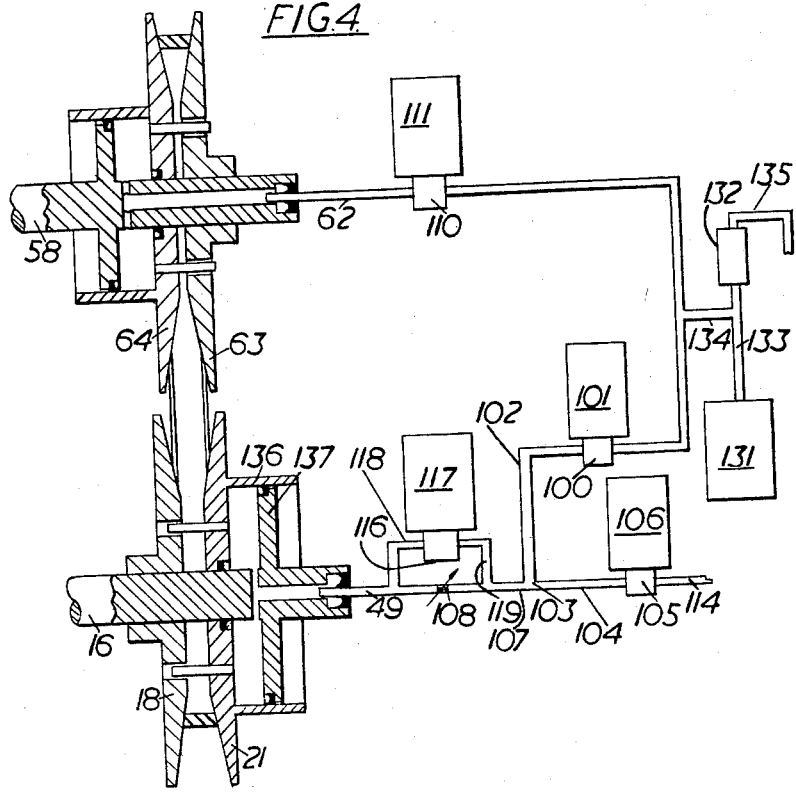
FIGURE 4 is a modification of the arrangement shown in FIGURE 3.

In the arrangements so far described the two hydraulic pistons and cylinders are of the same effective area and the differential movement of the two pulleys is obtained by applying a higher or a lower pressure to one cylinder while maintaining a constant pressure in the other cylinder. In the modification shown in FIGURE 4, in which parts are given reference numbers corresponding to those in FIGURE 3 where applicable, a pump 131 supplies hydraulic liquid under pressure and a valve 132 connected thereto by pipes 133 and 134 maintains a constant pressure in the system, the overflow from the valve 132 being returned to the liquid reservoir through a pipe 135. The driven shaft consisting of a fixed flange 63 and movable flange 64 carried on shaft 58 is exactly the same as in FIGURE 3 but the diameter of the cylinder 136 on the movable flange 21 of the pulley on the driving shaft 16 is made larger in diameter and the piston 137 is correspondingly larger. The valves 100, 105, 110 and 116 are provided, as in FIGURE 3, and serve the same purpose, and the restriction 108 is also provided as before. In FIGURE 4 the electrical lines are not shown since the arrangement of the switching is the same.

The operation of this arrangement is as follows. When it is desired to expand the driving pulley carried on the shaft 16 and to contract the driven pulley carried on the shaft 58 the valves 100 and 110 are both opened so that the cylinders on both pulleys are connected with the pressure source provided, in the form of the pump 131. Owing to the larger area acted upon by the liquid in the cylinder 136 the input shaft pulley is expanded, the rate of expansion being governed by the rate of flow through the restriction 108, and liquid is forced out of the cylinder in the output shaft pulley through the valve 110 and into the high pressure liquid circuit. When the input shaft pulley has been contracted to the desired extent the switch controlling the valves 100 and 110 is opened and the system continues to run at the speed ratio which has been set. When it is desired to contract the input shaft pulley and expand the output shaft pulley the valves 105 and 110 are opened, so that the cylinder of the output shaft pulley is connected to the pump 131 while the pipe 107 is connected through the valve 105 to the pipe 114, which leads back to the liquid reservoir. The pressure liquid acting on the output shaft pulley causes this pulley to expand, so that liquid is forced out of the cylinder 136 of the input shaft pulley and escapes back into the reservoir, the rate of flow being again governed by the restriction 108.

The valve 117 may be used, as previously described, to produce a rapid change of speed by opening it simultaneously with the valves 100 and 110 or the valves 105 and 110.

This system has the advantage of simplictiy in the hydraulic liquid supply arrangements because only one output pressure is required, instead of two different output pressures as in the arrangement of FIGURE 3.

I claim:

1. A variable speed drive comprising, in combination, an input shaft, a first expansible pulley having fixed and movable flanges mounted on said input shaft, hydraulic piston and cylinder means to move said movable flange for expanding said first pulley when hydraulic pressure is applied thereto, an output shaft, a second expansible pulley having fixed and movable flanges mounted on said output shaft, second hydraulic piston and cylinder means for expanding said second pulley when hydraulic pressure is applied thereto, a belt trained around said first and second pulleys, means to supply hydraulic fluid under pressure to both cylinders of said piston and cylinder means, a valve between said first hydraulic means and said pressure supply means to shut off the connection therebetween, a second valve between said second hydraulic cylinder and said pressure supply means, flow restriction means between said first hydraulic cylinder and said first valve, and control means for said valves to apply a given force to said first movable pulley flange and a lower force to said second movable pulley flange in order to expand said first pulley while contracting said second pulley and to apply a lower force to said first movable pulley flange and the same force to said second movable flange to expand said second pulley while contracting said first pulley.

2. A drive as claimed in claim 1 wherein said first and second hydraulic piston and cylinder are of equal effective area and said means to vary said expanding force differentially includes control valve means to maintain a substantially constant pressure in said second cylinder and selectively to vary the pressure in said first cylinder above or below said constant pressure.

3. A drive as claimed in claim 1 wherein said first and second hydraulic piston and cylinder have different effective areas and said means to vary said expanding force includes control valve means to apply the same hydraulic pressure to both cylinders or to apply the hydraulic pressure to the smaller cylinder and to connect the larger cylinder to atmosphere.

References Cited in the file of this patent

UNITED STATES PATENTS

| | | |
|---|---|---|
| 2,150,456 | Perrine | Mar. 14, 1939 |
| 2,660,069 | Horne | Nov. 24, 1953 |
| 2,779,203 | Eubanks | Jan. 29, 1957 |
| 2,868,584 | Faust | Jan. 13, 1959 |
| 2,887,893 | Claas | May 26, 1959 |
| 2,916,927 | Oppter | Dec. 15, 1959 |

FOREIGN PATENTS

| | | |
|---|---|---|
| 565,857 | Belgium | Apr. 15, 1958 |